Dec. 1, 1925.

1,563,826

G. BERNERT

CONVEYER APPARATUS FOR GRAIN AND LIKE MATERIAL

Filed Feb. 9, 1920

Inventor
George Bernert
By Frank S. Ratcliffe
Attorney.

Patented Dec. 1, 1925.

1,563,826

UNITED STATES PATENT OFFICE.

GEORGE BERNERT, OF MILWAUKEE, WISCONSIN.

CONVEYER APPARATUS FOR GRAIN AND LIKE MATERIAL.

Application filed February 9, 1920. Serial No. 357,450.

*To all whom it may concern:*

Be it known that I, GEORGE BERNERT, a citizen of the United States, and resident of Milwaukee, in the county of Milwaukee and State of Wisconsin, have invented certain new and useful Improvements in Conveyer Apparatus for Grain and like Material; and I do hereby declare that the following is a full, clear, and exact description thereof.

My invention relates to new and useful improvements in conveying apparatus for grain and like materials, and more particularly of that type wherein the material is fed into a pneumatic duct to elevate said material or to transport the material horizontally.

It is primarily the object of my invention to increase the efficiency of operation of apparatus of this character with respect to the various conditions of operation which would be encountered in use, particularly in view of variations in the characteristics of the materials conveyed; and to increase the economy of time, labor, and power incidental to supply of material to the apparatus under certain conditions wherein desired discharge of material to the apparatus would be effected at a greater rate of flow than the given capacity of the conveying air column.

In the use of a conveying apparatus of the present character, the grain may be delivered to the apparatus in wagon loads from the field or other primary point of supply, and a considerable amount of time would be necessarily involved in manipulating the filled wagons for discharge to the apparatus, and in removing the empty wagons from the apparatus, and thus the periods of discharge of material from the wagons to the apparatus would be interrupted for substantial periods of time, and unless the conveying column of air in the apparatus would be of relatively great capacity requiring a large apparatus and a large expenditure of power, valuable time and labor would be lost in the similar types of apparatus heretofore provided by reason of the necessity of delaying the discharge of material from the wagons so as to correspond to the conveying capacity of the air column.

It is, therefore, an important object of my invention to provide a conveyer apparatus unit which is adapted to receive the grain at its normal rapid rate of discharge from the wagons or other receptacles in which it would be carried, and which is adapted to feed such grain into the pneumatic duct at a relatively lesser rate of flow for the conveying action of the air column therein, whereby the pneumatic air column may operate in a practically continuous manner to convey the grain, with intermittent supply of grain to the apparatus by wagons which would be successively driven up to the apparatus and dumped therein, thus permitting the use of a relatively small pneumatic mechanism with decided economies of time, of power and of labor which would otherwise be idle for intermittent periods.

I have found that the air duct possesses different conveying capacities for different grains and for different conditions of moisture of any given grain, and the feeding conveyer for the air duct, operating in definite relation to the current generating means of said duct, would tend to feed at times an amount of grain which would not correspond to the effective capacity of the air duct. It is, therefore, a further important object of my invention to provide an arrangement for procuring a proper supply of material to the air duct irrespective of variations in the characteristics of such material which would affect the ability of the conveying air column to carry the same in conveying movement.

My invention contemplates the provision of a feeding hopper or compartment connected with the air duct by a feeding conveyer casing, communication between said casing and duct being controlled by a valve yieldably urged to closing position, and I have found that differences in the frictional characteristics of the material conveyed, caused in many instances by the different degrees of moisture of material, affects the opening movement of the said yielding valve, and it is a further object of my invention to compensate for the differences in frictional characteristics of the material so as to procure a uniform valve operation at all times.

In conveying the grain to the air duct, through the feeding conveyer casing, there would exist a tendency for a back pressure flow of air to pass outwardly through said conveyer casing and blow the grain from the inlet mouth of the casing. It is, therefore, a still further object of my invention to provide an arrangement for preventing this back pressure flow of air in the casing from blowing grain out of the inlet mouth of the casing, and for utilizing this back pressure current of air to effect a cleaning action on grain by separating chaff and dirt therefrom.

It is a still further object of this invention to provide back pressure release means communicating with the conveyer supply casing for conditioning the grain as it passes therethrough by reason of the back pressure serving to thoroughly dry the grain and remove all moisture therefrom.

With the above and other objects and advantages in view, my invention resides more particularly in the novel combination, formation and arrangement of parts hereinafter described and pointed out in the appended claims.

Figure 1:
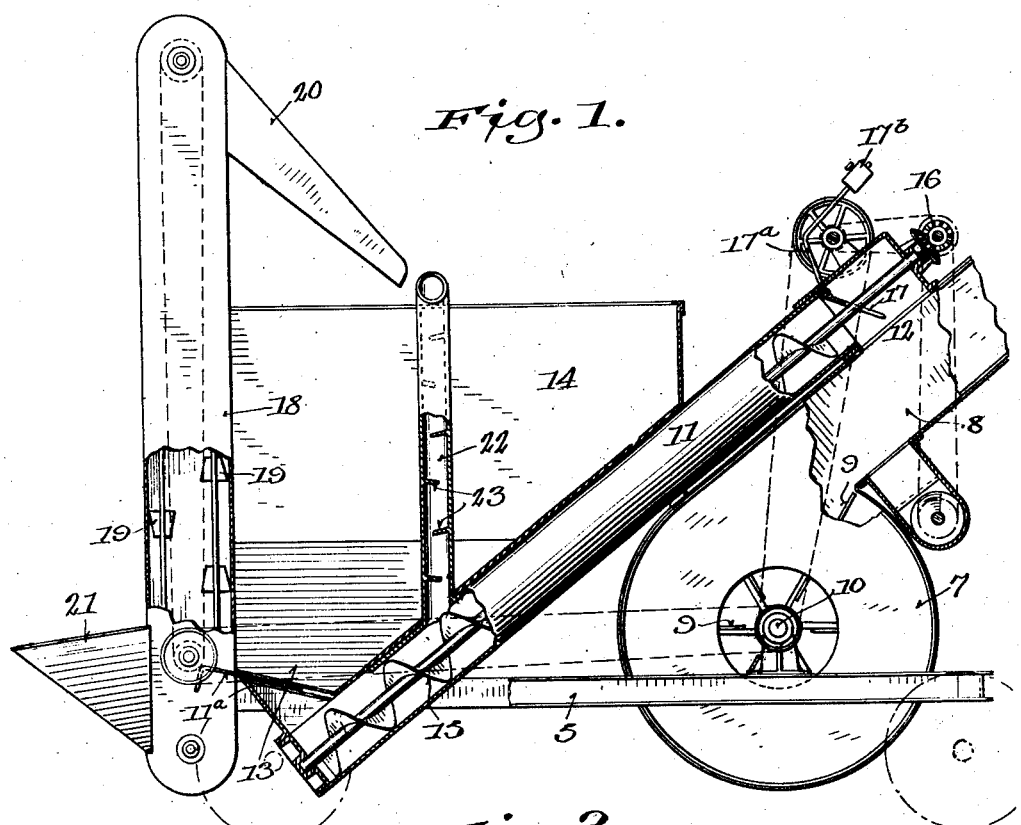
Figure 1 is a longitudinal sectional view of the conveyer apparatus embodying my invention.
Figure 2:
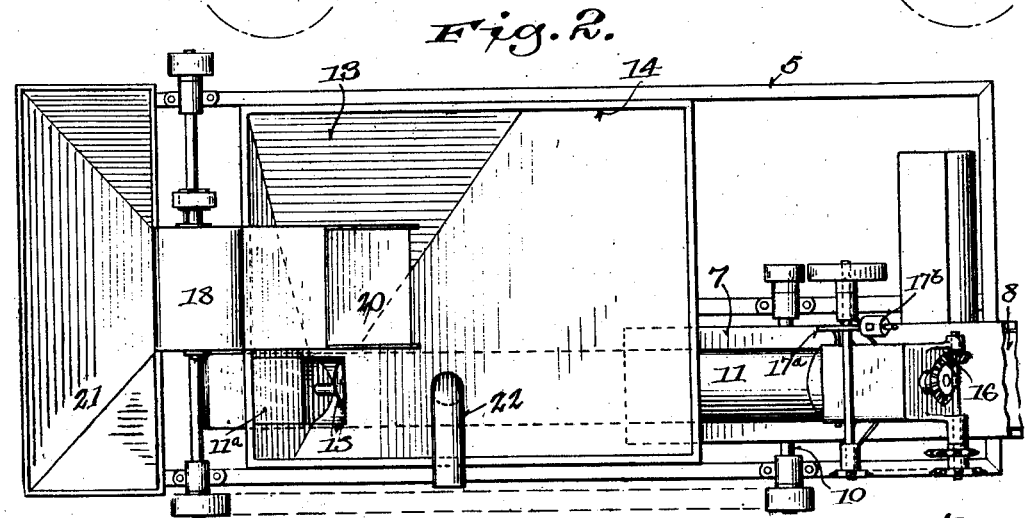
Figure 2 is a plan view of the invention.

Referring now more particularly to the drawings, in the present embodiment of my invention I provide a truck including the frame 5 supported by conventionally shown relatively small wheels 6 whereby the apparatus may be readily transported although it will be appreciated that the apparatus may be embodied in a stationary structure if desired. A fan casing 7 is mounted on one end portion of the frame 5, the lower portion of said casing extending below the frame. A pneumatic duct 8 extends from the fan casing obliquely upwardly and outwardly of the truck body. The usual blower fan 9 is disposed in this casing and carried by shaft 10. To procure discharge of material into the air duct 8 from the maximum lower point, as in previous Patent No. 1,200,699, granted to Jacob Bernert and me Oct. 10, 1916, I provide a conveyer casing 11 which has its upper end communicating with the inlet opening 12 in the top of the air duct, and which extends downwardly therefrom in substantially parallel relation to the air duct, said conveyer casing extending inwardly of the truck frame to point below said frame and communicating at its lower end with the hopper bottom portion 13 of a temporary storage compartment 14. Said hopper bottom portion has a major inclined wall disposed immediately over and extending in the direction of the feeding conveyer casing 11 and thus an exceeding compactness of structure is procured with a maximum capacity for the storage compartment arranged to wholly discharge by gravity into the lower end of the conveyer casing 11. A spiral conveyer 15 is mounted in the casing 11 and terminates short of the upper end of the casing, the shaft of this spiral conveyer being driven by suitable gear mechanism 16, a common drive being afforded for the spiral conveyer and the blower fan 9 which procures the conveying current of air. It is observed that the conveying capacity of the spiral conveyer 15 is determined by the bulk or volume of the material to be conveyed, while the conveying capacity of the air duct 8 is determined by the weight and surface area of the particles of the material to be conveyed and thus variations in the relative capacities of these two conveying means will occur incidental to the variations in specific gravity or other characteristics of the material conveyed.

To provide in the present machine for most efficient operation of the device under such varying conditions, I provide a relatively high speed drive connection for the conveyer 15 whereby said conveyer has a capacity for heavier material greater than the conveying capacity of the air duct, and I control the capacity of the conveyer 15 by varying the area of the inlet opening of the casing 11 of said conveyer, such variations being effected in the present instance by a cut-off slide plate 11$^A$, mounted in the bottom hopper portion of the storage compartment 14 and movable across the inlet opening of the casing 11.

In the aforedescribed structure, the temporary storage compartment 14 may be disposed at a maximum low elevation by reason of the relation of conveyer and air duct parts co-operating with its hopper bottom 13, as described and claimed in the aforementioned patent. This temporary storage compartment has a capacity substantially equal to the maximum wagon load of grain or the like which would be delivered to the apparatus and hence its top is disposed at a considerable elevation.

For procuring discharge of a wagon contents into this temporary storage compartment, a vertical elevator casing 18 is disposed at the outer wall of the compartment and secured thereto, an endless bucket elevator 19 being disposed in this casing. The upper end of the elevator casing extends a considerable distance above the top of the compartment 14 and carries a spout 20 closed at its top and inclined obliquely outwardly toward the center of the compartment, this spout being adapted to receive the overthrow discharge of grain from the elevator and to direct said grain substantially to the center of the compartment whereby said compartment may be filled to a maximum extent by this elevator means. The lower portion of the elevator casing communicates with the central portion of a hopper 21 which is elongated transversely of the length of the truck frame 5, the length of the hopper being substantially equal to the width of the truck whereby, to amply accommodate the discharge of grain from a wagon body. The capacity of the elevator 19 is such with respect to the capacity of the conveyer 15 in conjunction with the air duct that the elevator 19 normally operates to fill the temporary storage compartment at a much faster rate than said compartment is emptied by the conveyer 15 and thus by making the elevator of a relatively greater capacity per time unit, my improved apparatus is adapted to receive the grain at its normal rapid rate of discharge from the wagons or other receptacles in which the grain would be carried to the apparatus, and is adapted to feed the grain into the pneumatic duct at a rate corresponding to the given conveying capacity of the duct, thus providing for operation of the duct to continuously convey the grain, with intermittent supply of grain to the apparatus by wagons which would be successively driven up to the apparatus and dumped therein. I am thus enabled to utilize, in conveying operation of the pneumatic duct, the intermittent periods of time which would otherwise be lost in positioning the wagons for discharge and removing them from the apparatus, and I am thus enabled to employ in the present apparatus a smaller type of pneumatic mechanism than would otherwise be necessary, and to effect a material saving of time, labor which would otherwise be idle, and power, and to also avoid material fluctuations in the power requirements of the apparatus, it being incidentally noted that more power is required to operate the pneumatic mechanism at the given speed of fan rotation when the mechanism is operated idly, than when the mechanism is conveying grain, this apparently contradictory situation being due to the fact that a lesser quantity of air passes through the fan casing when the conveying air duct has its conveying charge of grain fed therein, the air resistance conditions with respect to the fan being at all times solely contingent upon the amount of air which is permitted to pass through the fan casing, and idle periods in the blower operation would procure considerable fluctuations of power for the reason above stated.

Communication between the conveyer casing 11 and the air duct is controlled by a valve 17, hinged within the upper portion of the casing at the outer side thereof and adapted to have its free edge engage in closing position at the inner end of the intake opening of the air duct, said valve being slotted to receive the shaft of the conveyer 15 therethrough, and in operation a certain back pressure flow of air would pass through this slot and downwardly in the conveyer casing 11. An arm 17$^a$ projects upwardly from the valve above the casing and has its free end portion directed laterally and slidably mounting an adjusting weight 17$^b$ whereby the valve is yieldably held in closing position against the direct pressure of grain effected by the conveyer screw 15.

Differences in the frictional characteristics of the material conveyed through the casing 11, which may be due to moisture of the material, affect the yielding action of the valve, and thus by adjusting the weight 17$^b$ along its arm, the yielding resistance of the valve may be adjusted so as to procure a proper yielding action under the various conditions encountered in general use of the apparatus.

In the operation of a machine of the present character, pressure of air from the air duct procures a retrograde flow of air through the feeding conveyer casing, despite its control valve, thus resulting in blowing grain from the feeding hopper under certain conditions. To eliminate this objectionable back flow of air into the feeding hopper, I provide a vent duct 22 upstanding from the conveyer casing adjacent to its point of intake, this duct projecting in the present instance through the temporary storage compartment 14 and having its upper end extended above the compartment and directed laterally. A series of baffle plates 23 are disposed in the duct to prevent passage of grain through the duct without interfering with the free escape of air. In providing this air escape means, I have discovered that the heretofore objectionable back pressure flow of air through the casing 11 may be utilized to effect a positive cleansing action on the grain by separating chaff and dirt therefrom, which is carried by the air outwardly of the casing through the vent duct. This cleansing action is thorough in nature, by reason of the fact that the back pressure current of air passes downwardly along the top of the conveyer casing 11, and the conveyer screw 15, in conveying the grain upwardly in the casing continuously turns the grain across this retrograde current of air, the lighter particles in the grain being thus caught by the current of air and carried outwardly and finally discharged with the air through the vent duct. Hence, instead of striving to eliminate such back pressure current of air, I employ a certain positive back pressure flow to procure cleaning action on the grain.

Summarizing the entire foregoing description, it is seen that I have provided a highly efficient pneumatic conveying apparatus particularly adapted in the present embodiment for use as a portable loading machine, and wherein means is provided for compensating for the varying conditions of operation which would be encountered in the general uses of the machine.

While I have shown and described a preferred embodiment of my invention, it will be appreciated that various changes and modifications of structure and relation may be employed to meet differing conditions of use and manufacture, and that various phases of my invention may be employed independently of the specific mechanism described without departing in any manner from the spirit of my invention, as defined by the appended claims.

What is claimed, is:

1. In a pneumatic conveyer mechanism, the combination of a material conveying air duct and a conveyer casing having a material inlet and outlet, the latter being in communication with said air duct, a conveyer within said casing for conveying material therethrough and into said air duct, a vent adjacent the inlet of said casing, and said vent releasing any back pressure contained within said casing.

2. In a pneumatic conveyer mechanism, the combination of a material conveying air duct and a conveyer casing having a material inlet and outlet, the latter being in communication with said air duct, a conveyer for moving material through said casing and into said air duct, a vent adjacent the inlet of said casing, and said vent releasing any back pressure contained within said casing.

3. In a pneumatic conveyer mechanism, the combination of a material conveying air duct and a conveyer casing communicating therewith, a material inlet for said casing, means for conveying the material through said casing and into said air duct, a vent adjacent the inlet of said casing, and said vent releasing any back pressure contained within said casing.

4. In a pneumatic conveyer mechanism, the combination of a material conveying air duct and a conveyer casing communicating therewith, said casing having a material inlet, a conveyer for delivering material through said casing and into said air duct, a vent adjacent the inlet of said casing, and said vent releasing from said casing any back pressure entering the same at its point of communication with said air duct.

5. In a pneumatic conveyer mechanism, the combination of a material conveying air duct and a conveyer casing having a material inlet and outlet, the latter being in communication with said air duct, means for conveying material through said casing, a vent adjacent the inlet of said casing adapted to release therefrom any back pressure contained within said casing, and said back pressure adapted to condition the material as it passes through said casing.

6. In a pneumatic conveyer mechanism, the combination of a material conveying air duct and a casing having a material inlet and outlet, the latter being in communication with said air duct, means for conveying material through said casing, a vent adjacent the inlet of said casing, and said vent releasing from said casing any back pressure after the same has passed over the material within said casing.

7. In a pneumatic conveyer mechanism, the combination of a material conveying air duct and a casing having a material inlet and outlet, the latter being in communication with said air duct, means for conveying material through said casing, a vent adjacent the inlet of said casing and between the same and its outlet, said vent releasing from said casing any back pressure after the same has passed over the material within said casing, and means adjacent the outlet of said casing for controlling the back pressure admitted into said casing.

8. In a pneumatic conveyer mechanism, the combination of a material conveying air duct and a casing having a material inlet and outlet, the latter being in communication with said air duct, means for conveying material through said casing, a vent within said casing and between its inlet and outlet, means adjacent said outlet for controlling the back pressure admitted into said casing from said air duct, and said back pressure conditioning the material within said casing on its way therethrough to said vent.

9. In a pneumatic conveyor mechanism, the combination of a material conveying air duct and a conveyer casing having a material inlet and outlet, the latter being in communication with said air duct, a conveyer within said casing for conveying material therethrough and into said air duct, a vent within said casing and between its inlet and outlet, and said vent releasing any back pressure contained within said casing.

10. In a pneumatic conveyer mechanism, the combination of a material conveying air duct and a conveyer casing having a material inlet and outlet, the latter being in communication with said air duct, means for conveying material through said casing and into said air duct, a vent within said casing and positioned between its inlet and outlet, and said vent releasing any back pressure accumulating within said casing.

In testimony that I claim the foregoing I have hereunto set my hand at Milwaukee, in the county of Milwaukee and State of Wisconsin.

GEORGE BERNERT.